United States Patent
Neil

(10) Patent No.: US 7,779,029 B2
(45) Date of Patent: Aug. 17, 2010

(54) METHOD, SOFTWARE AND DEVICE FOR EFFECTING INDEPENDENTLY REFRESHABLE, MARKUP LANGUAGE-BASED DATABASE QUERIES AND USER INTERFACE SCREENS

(75) Inventor: Tim Neil, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 720 days.

(21) Appl. No.: 11/449,587

(22) Filed: Jun. 9, 2006

(65) Prior Publication Data

US 2007/0288424 A1 Dec. 13, 2007

(51) Int. Cl.
*G06F 17/30* (2006.01)
(52) U.S. Cl. ...................................... 707/769; 715/234
(58) Field of Classification Search ........................ None
See application file for complete search history.

(56) References Cited

U.S. PATENT DOCUMENTS

| | | | | |
|---|---|---|---|---|
| 6,182,156 | B1 * | 1/2001 | Togawa | 719/316 |
| 6,438,192 | B1 * | 8/2002 | Erbes et al. | 376/372 |
| 7,194,695 | B1 * | 3/2007 | Racine et al. | 715/780 |
| 2002/0030703 | A1 * | 3/2002 | Robertson et al. | 345/853 |
| 2002/0032701 | A1 * | 3/2002 | Gao et al. | 707/513 |
| 2003/0011640 | A1 * | 1/2003 | Green et al. | 345/810 |
| 2003/0043192 | A1 * | 3/2003 | Bouleau | 345/762 |
| 2003/0167315 | A1 | 9/2003 | Chowdhry et al. | |
| 2004/0225633 | A1 * | 11/2004 | Jau | 707/1 |
| 2005/0278353 | A1 * | 12/2005 | Norgaard et al. | 707/100 |
| 2006/0047665 | A1 | 3/2006 | Neil | |
| 2006/0190308 | A1 * | 8/2006 | Janssens et al. | 705/5 |
| 2006/0230207 | A1 * | 10/2006 | Finkler | 710/240 |

FOREIGN PATENT DOCUMENTS

WO   WO 01/50712 A2   7/2001

* cited by examiner

*Primary Examiner*—John R. Cottingham
*Assistant Examiner*—Nicholas E Allen

(57) ABSTRACT

To effect database queries and user interface screens that are independently refreshable and markup language-based, a machine-readable medium contains object-oriented code for defining a database query, including instructions for storing the result of the database query, based on a markup language element representation of the query, and object-oriented code for displaying a user interface screen based on a markup language element representations of the screen which has a display element that is based at least in part upon the result of the database query. The machine-readable medium also contains object-oriented code for refreshing the database query and object-oriented code for refreshing the screen that are capable of mutually exclusive instantiation based upon a user specification of one of a markup language element representing a refreshing of the database query and a markup language element representing a screen refresh. The markup language may be Extensible Markup Language (XML).

15 Claims, 20 Drawing Sheets

```
32  </EDITBOXES>
33  <BUTTONS>
34    <BTN NAME="BTN1" INDEX="1" CAPTION="REFRESH">
35      <EVENTS>
36        <EVENT TYPE="ONCLICK" ...>
37          <ACTION TYPE="REFRESHQUERY" QUERYNAME="GLOBALQUERY1"/>
38          <ACTION TYPE="REFRESH" NAME="SCREEN1"/>
39        </EVENT>
40      </EVENTS>
41    </BTN>
42  </BUTTONS>
43  <SCREEN>
44  :  // other screens
45  <SCREENS>
46  :
```

MASTER DEFINITION FILE 134

FIG. 10B

```
1   Public class Screen
2   {
3       // represents a single GUI screen for a mobile application
4
5       string name;      // screen name-unique to relevant mobile device type/platform
6       string title;     // text to appear in screen title bar
7       string XML;       // XML markup language defining this screen
8                         //   (from application definition file)
9       Editbox[] editboxes; // array of objects representing edit boxes on this screen
10      Button[] buttons;    // array of objects representing buttons on this screen
11      :
12      (other display elements)
13      :
14
15      public void fromXML(<XML>)      // "constructor"
16      {
17          // - set local data members based on SCREEN element attributes
18          // - FOR each detected subordinate EB element within the SCREEN element XML:
19          //     1. Instantiate a new Editbox object and add to the editboxes array
20          //     2. Pass the XML for the EB element (including subordinate objects)
21          //        to new Edit box object's fromXML() method to initialize Editbox object
22          // - END FOR LOOP
23          // (repeat for other display elements represented by XML elements subordinate
24          //  to current , e.g., buttons, text items,)
25      }
26
27      public void RefreshScreen()
28      {
29          //- Clear all control values of their data
30          //- Refresh all local screen queries data
31          //- Repopulate all controls based on their datasource values
32      }
33  }
```

```
35   public void Display()
36   {
37       //- Create all of the screen controls for the screen
38       //- Arrange controls based on XY or index values
39       //- invoke RefreshScreen();
40   }
41
42
43
44   } // end class Screen
```

FIG. 12B

```
 1   Public class Editbox                                                                  ← 70
 2   {
 3       // represents a single editbox of a screen represented by a containing screen object
 4
 5       string name;          // name of editbox
 6       string text;          // text to appear in editbox (what a mobile device user would see)
 7       string index;         // ordinal number for editbox
 8       string caption;       // textual label to be presented near editbox
 9       string datasource;    // (optional) identifies query and field that populates this
10                             //     edit box.  Format is "query.field".
11       :
12       Event[] events;       // array of objects representing significant events for this editbox
13       :
14
15       public void fromXML(<XML>)    // "constructor"
16       {
17           //  - set local data members based on EB element attributes
18           //  - IF datasource specified
19           //    - THEN overwrite text data member with return result of general purpose function
20           //              getQueryField(query name, field name)  (parameters being parsed from
21           //              datasource data member)
22           //  - FOR each detected subordinate EVENT element within the EB element XML:
23           //       1. Instantiate a new Event object and add to the events array
24           //       2. Pass the XML for the EVENT element (including subordinate ACTION element(s))
25           //              to new Event object's fromXML() method to initialize Event object
26           //  - END FOR LOOP
27       }
28
29   } // end class Editbox
```

FIG. 13

```
 1  Public class Button
 2  {
 3    // represents a single button of a screen represented by a containing screen object
 4
 5    string name;      // name of button
 6    string index;     // ordinal number for button
 7    string caption;   // textual label to be presented within button
 8  :
 9  :
10    Event[] events;   // array of objects representing significant events for this button
11  :
12  :
13
14    public void fromXML(<XML>)    // "constructor"
15    {
16        // - set local data members based on BTN element attributes
17        // - FOR each detected subordinate EVENT element within the BTN element XML:
18        //     1. Instantiate a new Event object and add to the events array
19        //     2. Pass the XML for the EVENT element (including subordinate ACTION element(s))
20        //        to new Event object's fromXML() method to initialize Event object
21        // - END FOR LOOP
22    }
23
24
25
26  } // end class Button
27
```

```
1   Public class Action
2   {
3
4   // represents a single action to be performed upon the occurrence of an event represented
5   // by a containing event object                                                    ┌─ 76
6
7   string type;        // action type - one of a predetermined set of actions including
8                       //   OPEN (display new screen), ARML (compose and send XML message),
9                       //   SAVE (save fields marked as persistent), PURGE (clear scratchpad),
10                      //   NOTIFY (play notification sound), CLOSE (exit application),
11                      //   ALERT (display message box), IF..Then..Else (execute an alternative
12                      //   set of actions based on a condition), CLOSESCREEN (exit screen),
13                      //   SAVEITEM (save scratchpad variable), REFRESH (re-initialize all
14                      //   display elements on the screen), and REFRESHQUERY (re-execute
15                      //   a global query)
16
17  string name;        // name of screen to refresh for REFRESH action
18  string queryname;   // name of query to refresh for REFRESHQUERY action
19
20  : (other data members - may be action type-specific)
21
22  public void fromXML(<XML>)      // "constructor"
23  {
24      // - set local data members based on ACTION element attributes
25  }
26
27  public void doAction()          // perform the action represented by this action object
28  {
29      // SWITCH (type) {
30      //
31      //   CASE REFRESH:
32      //    - invoke general purpose routine RefreshScreen(name) to refresh
33      //
34      //   CASE REFRESHQUERY:
35      //    - invoke general purpose routine RefreshQuery(queryname)
```

```
36     //  ;
37     //  (case branches for other action types)
38     //  ..
39     //  } end switch
40         }
41         ;
42         }
43         ;
44     } // end class Action
```

FIG. 15B

```
1  public RefreshQuery(string queryname)
2  {
3      // - search for global query object whose name matches queryname
4      // - invoke runQuery() method of located query object
5  
6  }
7  public void executeQuery(Query query)  //
8  
9  {
10     // - (code for interacting with platform-specific mobile DBMS to run
11     //    querystr)
12     // - return resulting records matching the search parameters
13  
14  }
15 public string getQueryField(string queryname, string fieldname)
16 {
17     // - search for global query object whose name matches queryname
18     // - invoke getField(fieldname) method of located query object
19     // - return field value
20  
21 }
22 public void RefreshScreen(string screenname)
23 {
24     // - search for screen object whose name matches screenname
25     // - invoke refreshScreen() method of located query object
26  
27 }
28 :
29
```

FIG. 16

```
1   Public class WhereParam
2   {
3
4       // represents a single where parameter of a query
5
6       public string fieldname;
7       public string evaluator;
8       public string value;
9       public AndOr binding;           // AndOr is an enumeration of either the value
10                                      //   {bindAnd, bindOr}
11  } // end class WhereParam
```

FIG. 17

METHOD, SOFTWARE AND DEVICE FOR EFFECTING INDEPENDENTLY REFRESHABLE, MARKUP LANGUAGE-BASED DATABASE QUERIES AND USER INTERFACE SCREENS

FIELD OF TECHNOLOGY

The present disclosure relates to software and a device for effecting database queries and user interface screens that are independently refreshable and are markup language-based.

BACKGROUND

A software application may use a database for the purpose of storing or accessing application data. Executable code within the application may compose and submit queries to a database management system which retrieves application data matching specified search parameters from the database as required by the application. The purpose of a database query may be to obtain application data for populating the textual fields or other display elements of a graphical user interface (GUI) screen. In this case, the executable code that composes and submits a database query may be automatically executed every time the GUI screen is presented by the application, to ensure the currency of the application data to be displayed on the screen. If a user navigates to the same GUI screen more than once, the database query may be re-executed ("refreshed") each time the screen is redisplayed. This approach may be inefficient in some situations however, such as when the database is not updated frequently.

When a software application that performs database queries and displays user interface screens is to be executed by a wireless communication device, the application may initially be downloaded to the device via a wireless network. Because the cost of data transmission over a wireless network may be based upon the amount of data transmitted, it may be desirable to download the application with a minimal amount of data transmission.

A solution which addresses at least some of these concerns would be desirable.

BRIEF DESCRIPTION OF THE DRAWINGS

In the figures which illustrate example embodiments:

FIGS. 10A-10B illustrate an application definition file markup language document which governs the operation of one of the wireless communication devices of FIG. 1;

FIGS. 12A and 12B is a pseudocode representation of an object-oriented Screen class which may be instantiated at one of the wireless communication devices of FIG. 1;

FIG. 13 is a pseudocode representation of an object-oriented Editbox class which may be instantiated at one of the wireless communication devices of FIG. 1;

FIG. 14 is a pseudocode representation of an object-oriented Button class which may be instantiated at one of the wireless communication devices of FIG. 1;

FIGS. 15A and 15B contain a pseudocode representation of an object-oriented Action class which may be instantiated at one of the wireless communication device of FIG. 1;

FIG. 16 is a pseudocode representation of various general purpose routines which may be executed at one of the wireless communication device of FIG. 1; and FIG. 17. illustrates an object-oriented class representing a single where parameter of a query.

DETAILED DESCRIPTION

Figure 1:
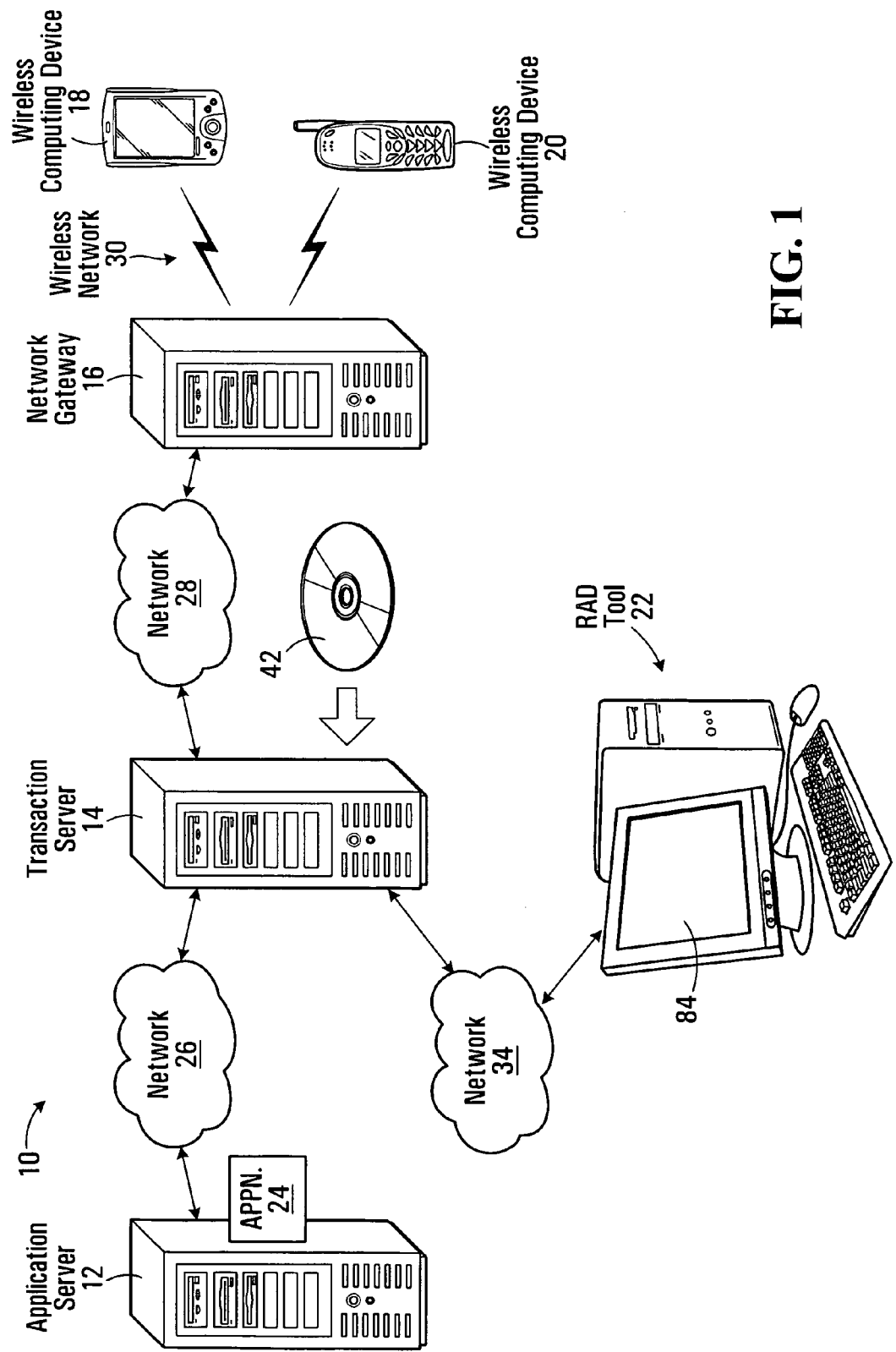
FIG. 1 is a schematic diagram illustrating a system for presenting data from a server-based application at a wireless communication device.

The present description generally pertains to an approach for effecting a refreshable database query based on a markup language representation thereof. Some embodiments, such as the one described hereinafter, may be implemented in the context of a system for presenting data from a server-based application at a wireless communication device, as described in U.S. patent Publication No. 2003/0060896 for example, which is incorporated by reference hereinto.

In one aspect of the below-described embodiment, there is provided a machine-readable medium comprising: object-oriented code for defining a database query based on at least one markup language element representing the database query, the object-oriented code including instructions for causing the database query to be performed and instructions for storing a result of the database query; object-oriented code for displaying a user interface screen having a display element that is based at least in part upon the result of the database query, the user interface screen being based on at least one markup language element representing the user interface screen; object-oriented code for refreshing the user interface screen based on a markup language element representing the refreshing of the user interface screen; and object-oriented code for refreshing the database query based on a markup language element representing the refreshing of the database query, wherein the object-oriented code for refreshing the user interface screen and the object-oriented code for refreshing the database query are capable of mutually exclusive instantiation based upon a user specification of one of the markup language element representing the refreshing of the user interface screen and the markup language element representing the refreshing of the database query.

In another aspect of the below-described embodiment, there is provided a wireless communication device comprising: a processor; and a memory coupled to the at least one processor, storing: object-oriented code for defining a database query based on at least one markup language element representing the database query, the object-oriented code including instructions for causing the database query to be performed and instructions for storing a result of the database query; object-oriented code for displaying a user interface screen having a display element that is based at least in part upon the result of the database query, the user interface screen being based on at least one markup language element representing the user interface screen; object-oriented code for refreshing the user interface screen based on a markup language element representing the refreshing of the user interface screen; and object-oriented code for refreshing the database query based on a markup language element representing the refreshing of the database query, wherein, the object-oriented code for refreshing the user interface screen and the object-oriented code for refreshing the database query are capable of mutually exclusive instantiation based upon a user specification of one of the markup language element representing the refreshing of the user interface screen and the markup language element representing the refreshing of the database query.

FIG. 1 is a schematic diagram illustrating an exemplary system 10 for presenting data from a server-based application at a wireless communication device. This embodiment is an enhancement of the system described in U.S. patent Publication No. 2003/0060896 (referred to herein as the "baseline system"). The enhancement permits refreshable database queries to be effected at a wireless communication device.

The system 10 of FIG. 1 includes an application server 12, a transaction server 14, a network gateway 16, a pair of exemplary wireless communication devices (also referred to as "mobile devices" herein and in U.S. patent Publication No. 2003/0060896) 18 and 20, and a Rapid Application Development (RAD) tool 22. The application server 12, transaction server 14, network gateway 16, and wireless communication devices 18 and 20 are analogous to the application server 70, middleware server 44, network gateway 40, and mobile devices 10 and 30, respectively, of U.S. patent Publication No. 2003/0060896, and will thus not be described in great detail, except to the degree that these components are modified from their implementation as described in the above-noted publication.

Application server 12 is a server which hosts at least one conventional software application 24 to which wireless communication device access is desired. The application 24 receives and generates data. The role of system 10 is to present data generated by the application 24 at wireless communication devices 18 and/or 20 and to send data generated at wireless communication devices 18 and/or 20 (e.g. responsive to user interaction with the devices) back to the application 24. The application server 12 sends and receives this data to and from transaction server 14 over a data network 26, which may be the Internet or a private data network for example, e.g. using HTTP running on top of a standard TCP/IP stack. In the present embodiment, the application 24 is an electronic mail (email) application, however in alternative embodiments, application 24 could be another type of application.

Transaction server 14 corresponds to middleware server 44 of U.S. patent Publication No. 2003/0060896. As described in that publication, the role of transaction server 14 is essentially twofold. First, the term serve 14 stores application-specific markup language documents (referred to as application definition files in the above-noted U.S. patent publication and hereinafter) for downloading by wireless communication devices 18, 20 desirous of presenting data from an application 24 executing at application server 12. The application definition files dictate the behavior and user interface (GUI) of the wireless communication devices. Second, once presentation of data from application 24 at a wireless communication device 18 or 20 has begun, the transaction server acts as an intermediary for communications between the application server 12 and the wireless communication device 18 or 20.

Network gateway 16 is a gateway between data network 28, which may be the Internet or a private data network for example, and a wireless network 30. In combination, data network 28, network gateway 16, and wireless network 30 facilitate communication of application data between the transaction server 14 and wireless communication devices 18 and 20.

Wireless communication devices 18 and 20 may for example be two-way paging devices, WinCE based devices (e.g. Pocket PC devices), PalmOS devices, WAP enabled mobile telephones, or the like, which are capable of presenting data from remote applications as described in detail in the above-referenced U.S. Patent Publication. Specifically, memory at devices 18 and 20 stores virtual machine software which interprets a textual application definition file downloaded from transaction server 14, describing: a GUI format for an application including control flow between GUI screens; the format of data to be exchanged over the wireless network 30 for the application; and the format of data to be stored in a database at the wireless communication devices 18 and 20. These aspects are described by markup language elements within the application definition file. The GUI screens and screen components presented at the wireless communication device 18 or 20 may emulate the GUI screens and components that a user would see when executing the full application 24 at a desktop computer or workstation. In the illustrated embodiment, wireless communication device 18 is of a different type than device 20, i.e., it executes a different operating system and may have different physical characteristics such as differently sized display screen or different processor.

RAD tool 22 is a computing device 120, such as an Intel®-Processor based personal computer (PC) for example, executing software that allows a developer to create master definition files for uploading to transaction server 14. A master definition file is a markup language document similar to an application definition file, except that its contents may dictate user interface appearance and control flow for more than one type of wireless communication device. Application definition files are created from master definition files at transaction server 14, as described in the above-referenced U.S. patent Publication No. 2003/0060896. Application definition files 58 are downloaded to wireless communication devices 18 and 20 where they are interpreted by virtual machine software. Uploading of the master definition file to from the RAD tool 22 to the application server 14 may be performed over a data network 34, which may be the Internet or a private data network for example.

Figure 2:
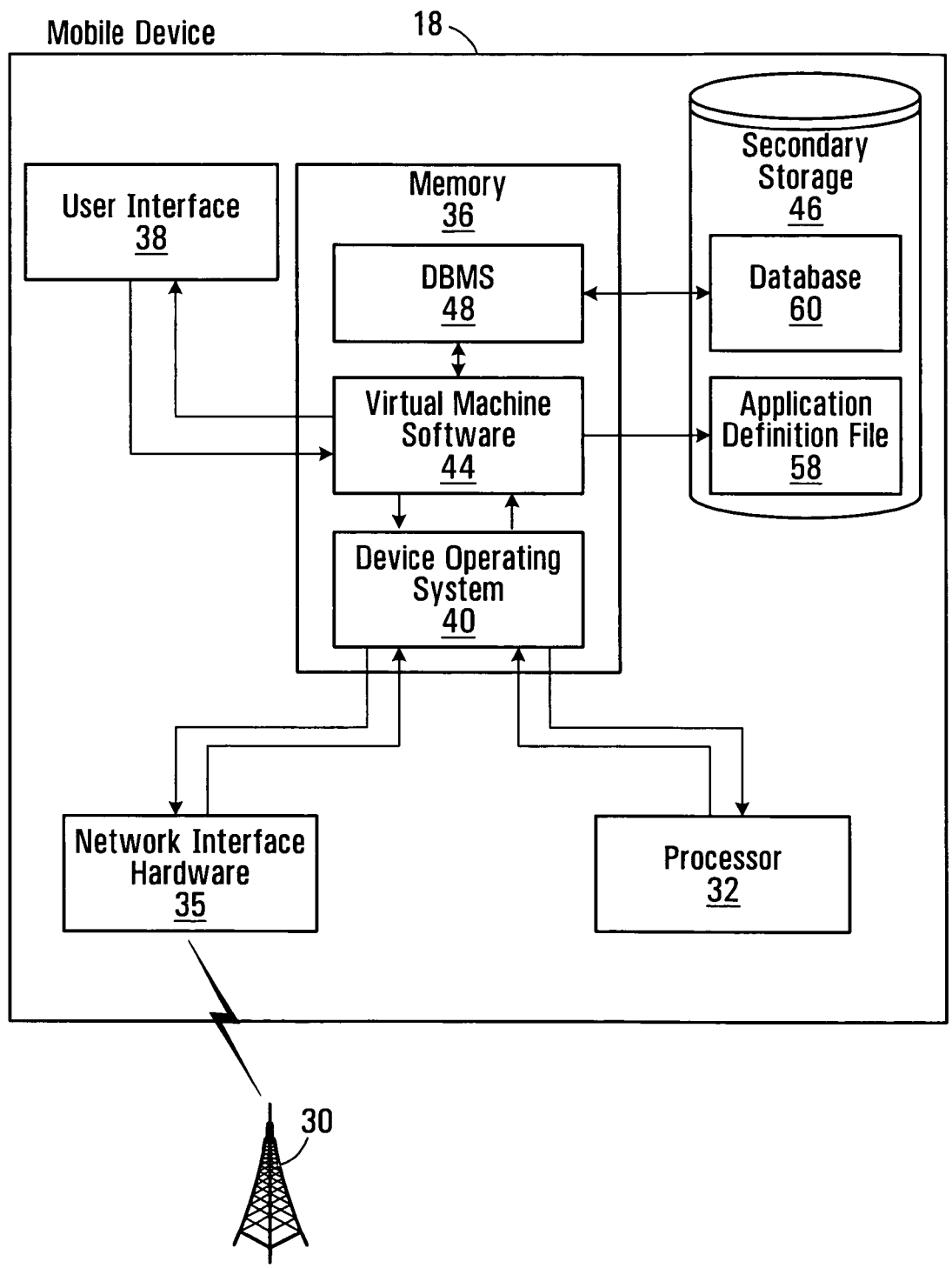
FIG. 2 is a schematic diagram illustrating a wireless communication device component of the system of FIG. 1 including virtual machine software.

FIG. 2 illustrates wireless communication device 18 in greater detail. Wireless communication device 18 may be any conventional wireless communication device, modified to function in the manner described below. As such, wireless communication device 18 includes a processor 32 in communication with a network interface 35, storage memory 36, a user interface 38, and local storage 46.

Network interface 35 enables device 18 to transmit and receive data over a wireless network 30.

Memory 36 is volatile memory such as static random access memory (SRAM). At run time, memory 36 stores an operating system 40, virtual machine software 44 and a database management system 48.

Operating system 40 is software representing a mobile operating system such as the Palm OS or WinCE operating system. Operating system 40 typically includes graphical user interface and network interface software having suitable application programmer interfaces (APIs) for use by applications executing at device 18.

Virtual machine software 44 is software that enables wireless communication device 18 to present a user interface for server-side applications such as application 24 (FIG. 1). The virtual machine software 44 may be downloaded over wireless network 30 to the device 18 from transaction server 14, where it may be stored as machine-executable code on a machine-readable medium such as a hard disk drive or a removable optical disk 42 (FIG. 1) for example. The operation of virtual machine software 44 is governed by the application definition file 58. The software 44 is described below in greater detail.

Database management system (DBMS) 48 is a conventional DBMS which facilitates storage of data to and manipulation of data from database 60 which is resident in secondary storage 46 of device 18. DBMS 24 may be a commercially available database management system, such as Sybase™, Microsoft® Pocket Access, Microsoft® SQLCE, Oracle, or J2ME MIDP storage, for example, capable of execution at a wireless communication device. DBMS 24 is capable of executing queries, such as structured query language (SQL)-type queries, for extracting desired data from the database 60. DBMS 24 provides an Application Programming Interface (API) for query execution.

User interface 38 provides a mechanism for entering data at wireless communication device 18 and for viewing a displayed graphical user interface. The interface 38 typically includes a keypad and a display such as a touch-screen.

Secondary storage 46 is non-volatile memory, such as flash memory for example, which stores an application definition file 58, and a database 60, described below.

Application definition file 58 is an application-specific markup language document which governs the operation of the wireless communication device 18. In the present embodiment, the application definition file 58 is an Extensible Markup Language (XML) document. The XML may for example be formed in accordance with the Extensible Markup Language (XML) 1.0 (Third Edition) W3C Recommendation dated 4 Feb. 2004, which is provided at www.w3.org/TR/2004/REC-xml-20040204/ and is hereby incorporated by reference hereinto. The XML document contains markup language elements (i.e. XML elements) including at least one XML element describing a refreshable database query. Based on the XML elements (including any attributes thereof) contained in the application definition file 58, the virtual machine software 44 instantiates corresponding objects at run time to present data from the server-side application 24 and to accept user input for transmission back to the application 24 at application server 12, as will be described.

Database 60 comprises one or more electronic files storing data related to application 24 for access by the virtual machine software 44 via DBMS 48. In the present embodiment, the data is stored in at least one table within the database 60 containing records (rows) with user-defined fields (columns). The database 60 may for example be a relational database, but this is not required.

The structure of wireless communication device 20 is similar to that of wireless communication device 18, with the exception of its operating system and certain physical characteristics.

Figure 3:
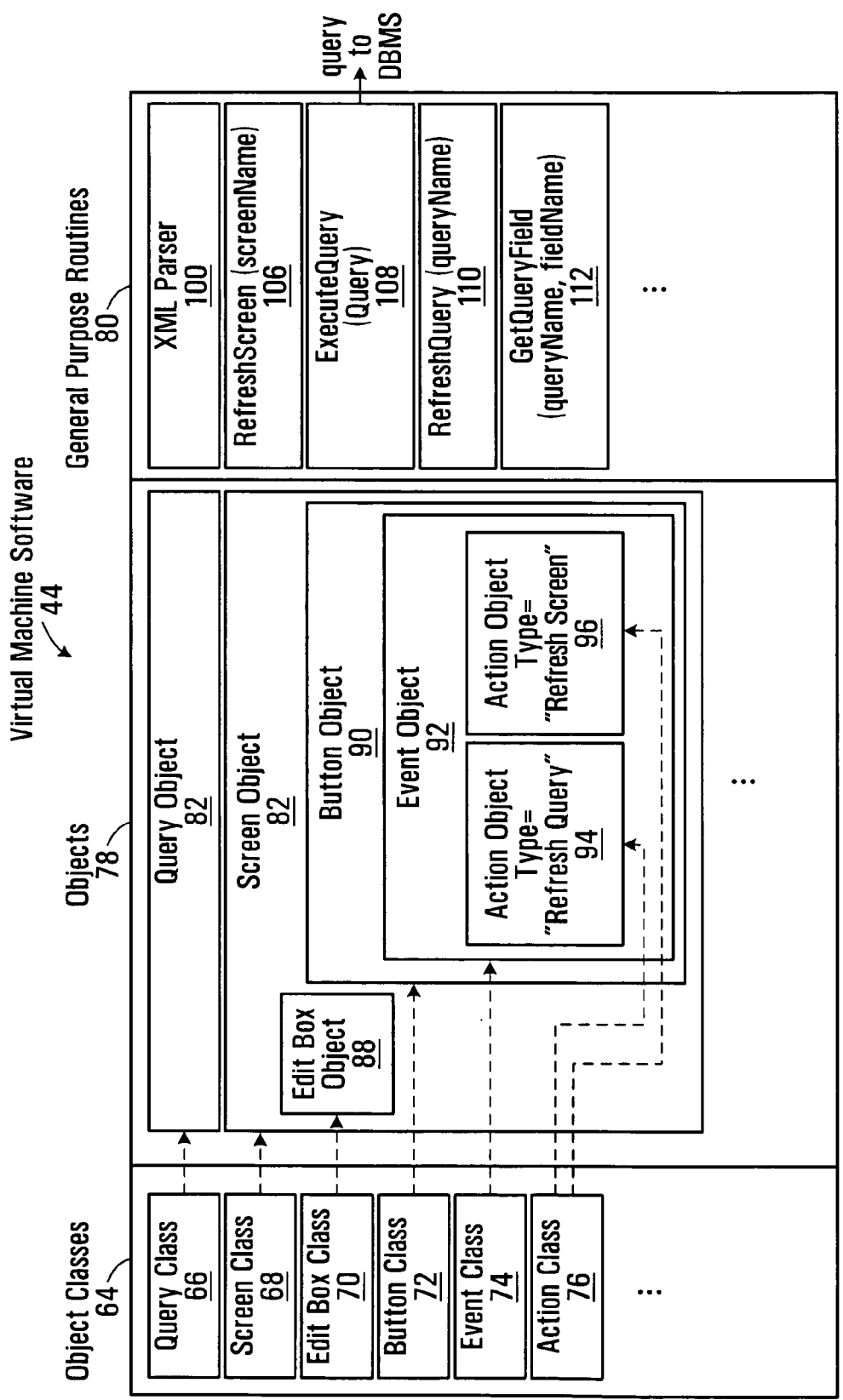
FIG. 3 is a schematic diagram illustrating the virtual machine software of FIG. 2 in greater detail.

FIG. 3 illustrates the virtual machine software 44 of FIG. 2 at run time. As illustrated in FIG. 3, virtual machine software 44 includes object classes 64, objects 78, and general purpose routines 80.

Object classes 64 are precompiled classes (object code) authored in an object-oriented language such as Java or C++. Each class corresponds to an XML element that may be defined within the application definition file 58. A description of some of the XML elements which may appear within the file 58 is provided in the AIRIX™ markup language (ARML) specification of Appendix "A" attached hereto; other XML elements are described, namely new refreshable database query elements which may be defined at a global mobile application level, as well as a new type for the ACTION element which permits global queries to be refreshed, and are described in the remainder of the description. A person of ordinary skill will readily appreciate that these cumulative XML entities are exemplary only, and may be extended, or shortened as desired. At run time, the virtual machine software 44 instantiates one or more instances of at least some of object classes 64 in memory 36 of wireless communication device 18 (FIG. 2) based on XML elements appearing within application definition file 58 and their attributes (the objects 78 of FIG. 3 are examples of such instances). Each object class 64 defines methods which capture certain behaviours that are performed by all instances of the class (e.g. a button class may include a highlights method which, if invoked for any instance of the button class, executes the same code to cause the relevant button to become highlighted), as well as data members which are set upon instantiation of a class instance in order to "customize" the characteristics or behaviour of the instance (e.g. the button class may also include X and Y coordinate data members which are set to unique values for each button class instance to define a unique location for the represented button on an encompassing GUI screen). In FIG. 3, object classes 64 include a database query class 66, a screen class 68, an edit box class 70, a button class 72, an event class 74 and an action class 76. These classes are described below in the context of operation of system 10 of FIG. 1. Other classes (not illustrated) may be included within classes 64. The classes 64 may be loaded from machine-readable medium 42 (FIG. 1) along with the rest of the virtual machine software 44.

Objects 78 are instances of object classes 64 that are created dynamically when the virtual machine software 44 is executed. The instantiation of objects 78 from classes 64 is indicated by dashed lines in FIG. 3. Each of objects 78 corresponds to an XML element defined within the application definition file 58. A more detailed description of the exemplary set of objects 78 of FIG. 3 is provided below in conjunction with the description of operation of the present embodiment.

General purpose routines 80 constitute a managing environment for the objects 78. The routines 80 encompass functionality which is useful for presenting a mobile application at the wireless communication device 18 but does not logically form part of a particular type of object 78. The routines 80 effectively consolidate certain functionality for convenient invocation from any of objects 78, as required. As shown in FIG. 3, the routines 80 include an XML parser routine 100, a RefreshScreen routine 106, an ExecuteQuery routine 108, a RefreshQuery routine 110, and a GetQueryField routine 112. These routines are described below in conjunction with the description of operation of the present embodiment.

Figure 4:
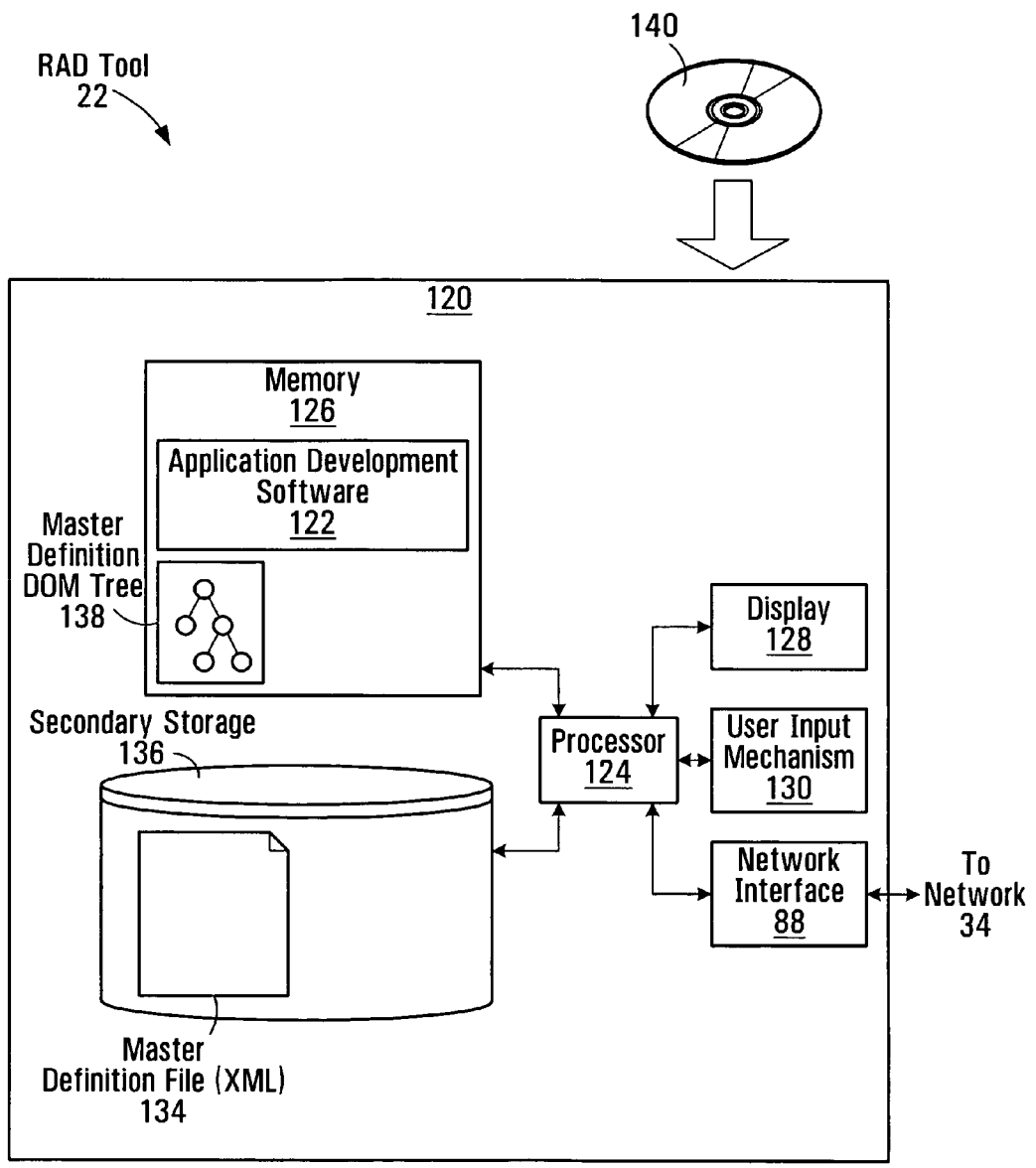
FIG. 4 is a schematic diagram illustrating a rapid application development (RAD) tool component of the system of FIG. 1 in greater detail.

FIG. 4 schematically illustrates the RAD tool 22 of FIG. 1 in greater detail. In the present embodiment, the RAD tool 22 is a PC 120 executing application development software 122. The PC 120 includes a processor 124 in communication with memory 126 which stores software 122. The PC 120 further includes a conventional display 128, such as a Cathode Ray Tube (CRT) monitor or flat-screen display for example, and a conventional user input mechanism (UIM) 130, such as a keyboard and/or a mouse for example. The PC 120 further includes a network interface card 132 (e.g. an Ethernet interface) which facilitates communication by the tool 22 over network 34, e.g. for purposes of uploading a master definition file 134 to the transaction server 14.

The application development software 122 provides a graphical user interface which facilitates "drag and drop" development of mobile applications. As a user develops a mobile application using UIM 130, the RAD tool 22 automatically generates a dynamically-accessible representation of the corresponding hierarchy of XML elements (e.g. in accordance with Appendix "A" within memory 126 and the below description) in the form of a master definition DOM tree 138 data structure. A DOM tree is essentially a dynamically-accessible representation of an XML document that is well understood in the art (DOM trees are described at www.w3.org/DOM/). The RAD software 122 may be implemented as a set of plug-ins to a generic integrated design environment (IDE) framework such as the Eclipse framework. As is known in the art, the Eclipse platform is designed for building integrated development environments that can be used to create various applications such as web sites, embedded Java™ programs, C++ programs, and Enterprise JavaBeans™ for example. The platform exposes mechanisms to use and rules to follow to tool providers via well-defined APIs, classes and methods. Application development software 122 may be written in Delphi, using an SQL Server database for example, and may be loaded into PC 120 from a machine-readable medium, such as an optical disk 140.

The master definition file 134 in secondary storage 136 is a serialized representation of the master definition DOM tree 138. The master definition file 134 is created by the application development software 122 when the user indicates that development of the mobile application is complete. The file 134 is stored in secondary storage 136 pending its transmission to the transaction server 14, where it is used to create an application definition file 58 that is downloaded to the wireless communication device 18.

In operation, a developer uses the RAD tool 22 (FIG. 4) to develop a mobile application for the wireless communication device 18. To develop a mobile application, the developer: designs one or more graphical user interface screens along with the screen-to-screen control flow for the mobile application; specifies a format of data (e.g. XML packages) to be exchanged with the server-side application 24 via wireless network 30 (FIG. 1); and specifies a format of data (e.g. a database table) for storing application data in database 60 (FIG. 2).

The procedure for developing a mobile application consists of creating a visual hierarchy or "tree" of icons which correlates to a logical hierarchy of XML elements (e.g. as defined in Appendix "A" and as further defined below) using application development software 22. Each icon represents a building block of the application (e.g. a GUI screen, a database table, a database query, etc.) and corresponds to a defined XML element having (in most cases) associated attributes. As a user creates icons and assigns properties to them, the RAD tool 22 automatically generates a dynamically-accessible representation of the corresponding hierarchy of XML elements and attributes within memory 126 within the master definition DOM tree 138 data structure. When the user of tool 22 has completed development of the mobile application, the application is "published", i.e. the master definition DOM tree 138 is serialized to form a master definition file 34.

Figure 5:
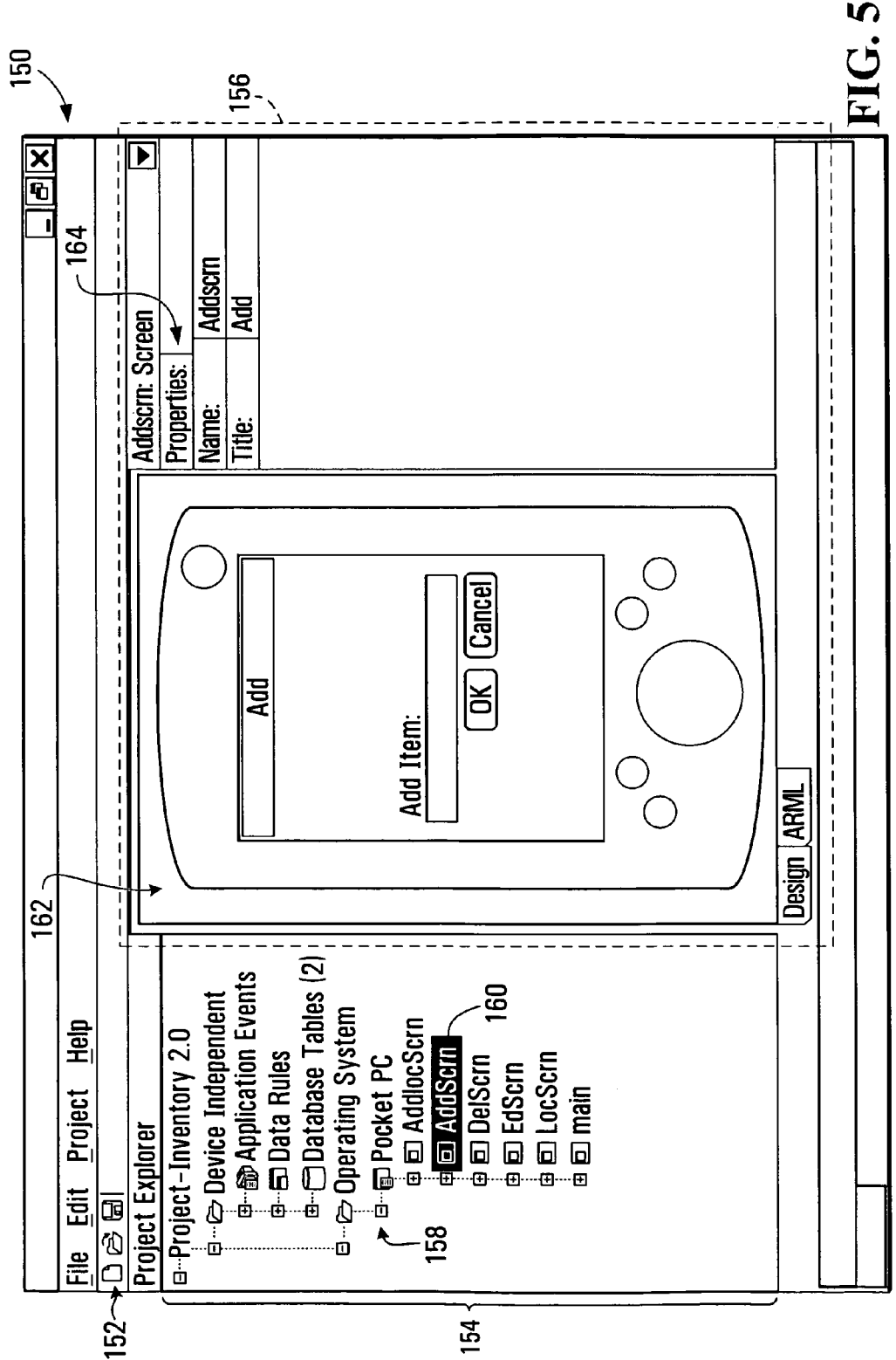
FIG. 5 illustrates a graphical user interface (GUI) of the RAD tool component of FIG. 4.

The RAD software 122 presents a GUI 150 as shown in FIG. 5 to facilitate mobile application development. The GUI 150 includes various components, such as a toolbar 152, a project explorer 154, and a main design area 156.

The toolbar 152 provides a menu list and icons for performing various development activities during mobile application development, such as creating or opening a project (which corresponds to a mobile application) or serializing a master definition file DOM tree 138 to create a master definition file 134.

The project explorer 154 contains a visual hierarchy of icons 158 that is created by the developer to represent the mobile application. A detailed view of an exemplary project explorer is provided in FIG. 6.

The main design area 156 is for displaying an application component, such as a GUI screen or GUI screen component, whose icon 162 is currently selected in the project explorer 154. This area may include a screen designer window 162 and a properties window 164. When an icon 160 is selected in the visual hierarchy, a graphical representation of the relevant component—a GUI screen in the case of icon 160—is displayed in the screen designer window 162 and its properties are displayed in the properties window 164. The screen designer is a "screen painter" which displays a graphical representation of the relevant wireless communication device type (a "virtual device") for which GUI screens are being created. In FIG. 5, a virtual Pocket PC device is show in the screen designer 162. The screen designer 162 permits a developer to design a GUI screen by dragging and dropping display elements (such as textual components, buttons, edit boxes, or other widgets) to the virtual device screen in the window, offering a "what you see is what you get" (WYSIWYG) view of the GUI screen under development. The properties window 164 displays the properties of a currently selected GUI component and allows them to be modified. The properties of a selected component generally correspond to attributes of an XML element within the master definition file DOM tree 138 corresponding to the selected component.

Figure 6:
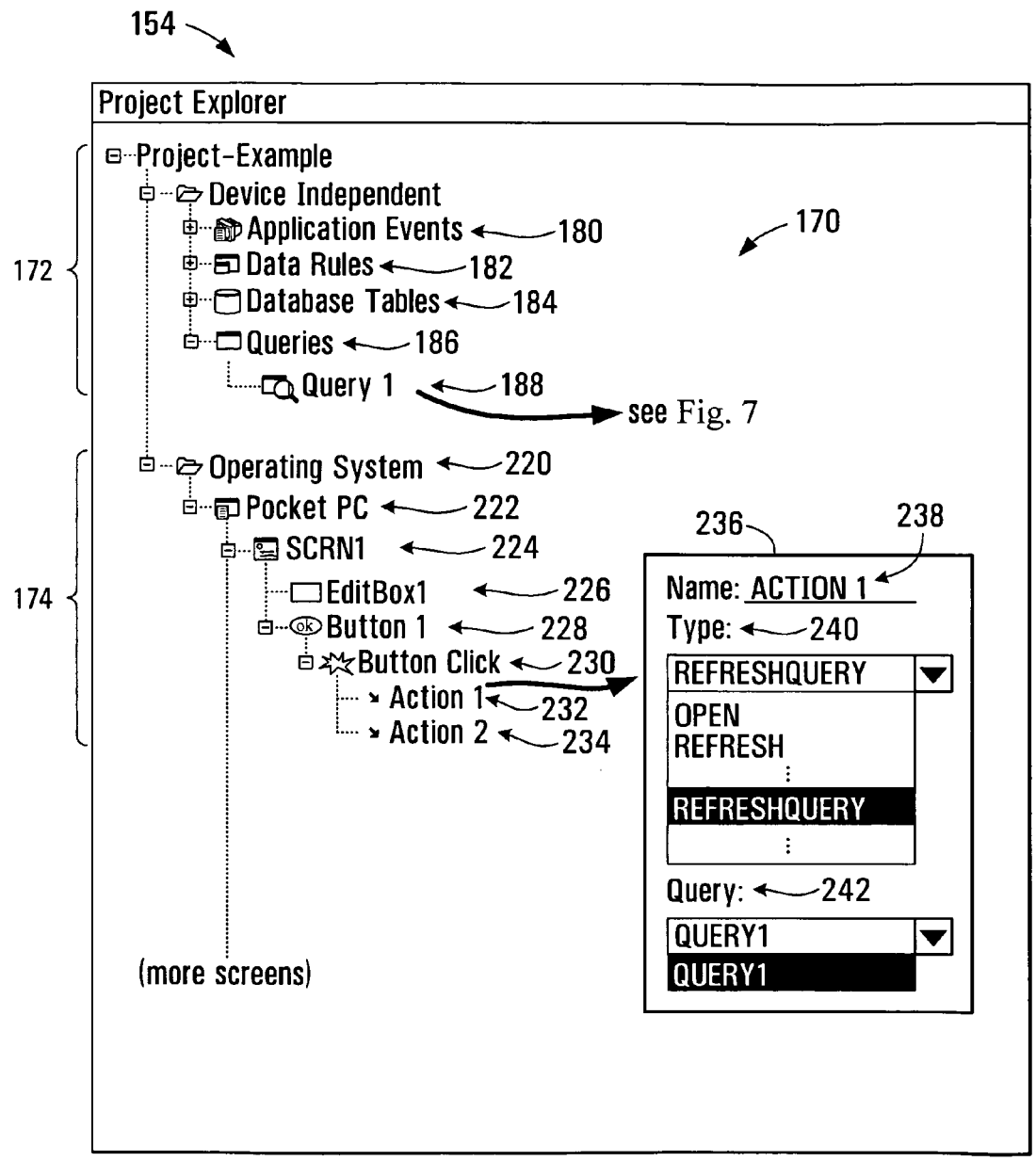
FIGS. 6 and 7 illustrate portions of the GUI of FIG. 5 in greater detail.

FIG. 6 illustrates a project explorer 154 containing an exemplary visual hierarchy of icons 170 which incorporates an exemplary database query. In certain respects, the hierarchy is similar in appearance to a graphical directory and file structure representation of a conventional operating system. Hierarchy branches are collapsible. When collapsed, a "+" symbol is displayed; when expanded, a "−" symbol is displayed. The visual hierarchy 170 includes platform-independent components 172 and platform-specific components 174.

Platform-independent components 172 are application building blocks which are present in each platform's version of the mobile application. Put another way, all application definition files which will ultimately represent the mobile application at a wireless computing device will contain components 172, regardless of the platform of the device. Platform-specific components 174, on the other hand, may differ between wireless communication devices of different types, such as devices 18 and 20. Typically, it is the GUI screens of a wireless communication device application which will differ in some measure between wireless communication device types, due to differences in the capabilities of the devices (e.g. screen size and supported display elements).

As shown in FIG. 6, the platform-independent components 172, which comprises the Device Independent branch of the visual hierarchy 170, include application events 180, data rules 182, database tables 184 and database queries 186.

Application events 180 are definitions of occurrences which trigger processing within the mobile application regardless of the application's status (e.g. regardless of which GUI screen is presently displayed). For example, the receipt of an XML package (message) at the wireless communication device 18 or 20 can be defined as an application level event. Beyond application level events, a developer may also define screen level events (arrival of an XML package when a specific GUI screen is displayed) and control level events (user manipulation of a GUI control such as a button press), however these are defined in the platform-specific constructs branch 174. It is noted that at least one action is normally defined in conjunction with each event to define the processing that will occur upon the occurrence of the event.

Data rules 182 dictate how XML packages received from enterprise applications such as application 24 affect data stored in database tables associated with an application. A rule typically defines which field(s) of a table will be impacted by incoming data and the nature of the impact. Because rules make reference to database tables, logically they are defined after the tables (described below) have been defined. Like application-level events 180, data rules 182 are wireless computing device type-independent. Rules also dictate how to apply changes to database tables from XML created in an outgoing XML transaction in the context of an ARML action.

Database tables 184 are defined for the purpose of storing application-related data at run time for use by the mobile application executing at the wireless communication device 18 or 20. The definition of database tables in this section results in the run-time creation of comparable database tables in the database 60 of wireless communication device 18 (FIG. 2).

Database queries section 186 contains definitions of refreshable database queries, which are a focus of the present description. A refreshable database query (or simply "database query") is defined for the purpose of retrieving application data from the database 60 at run time. The retrieved data is stored by the query and may be accessed by other application components, such as user interface components (e.g. in order to populate a GUI screen) or actions which cause XML packages to be constructed (e.g. in order to populate fields within the XML packages). The query is a "snapshot" of data from the database 60. A query defined in section 186 is considered to be global, in the sense that any application component, whether defined in the platform-independent branch 172 of the visual hierarchy 170 or defined in the context of a particular platform within the platform-specific constructs branch 174, may access its stored results. This may relieve a developer using RAD tool 22 from the burden of implementing the same database query for each platform represented in each platform-specific constructs branch 174, as may be required if database queries were not global. Database queries defined in section 186 are not automatically refreshed e.g. when a screen referencing the query is redisplayed, but rather are capable of being instructed to refresh themselves by other application components (including application components within either of platform-independent components branch 172, the platform-specific components branch 174) in response to application-level, a screen-level or control-level events. This control over the frequency and circumstances of database query refreshing gives the developer the power to refresh queries only when necessary, which may avoid unnecessary refreshing. Generally, the use of database queries facilitates development of complex mobile applications, because queries permit application data to be accessed and possibly combined with other extracted data in numerous ways.

The procedure for defining a database query in the database queries branch 186 may be as follows. The icon corresponding to the database queries section 186 may initially be selected with a mouse (or similar user input mechanism 130) of the RAD tool 22 (FIG. 4). A right-click (or similar user action) may cause a pop-up menu to be displayed. The pop-up menu may present a list of options in the context of the selected database queries section 186. An Add Query option may permit the user to define a new database query. Selection of that menu options may cause a new database query icon 188 to be created below icon 186, as shown in FIG. 6, and a Query Properties window 190, as shown in FIG. 7, to be displayed in the main design area 156 (FIG. 5).

Figure 7:
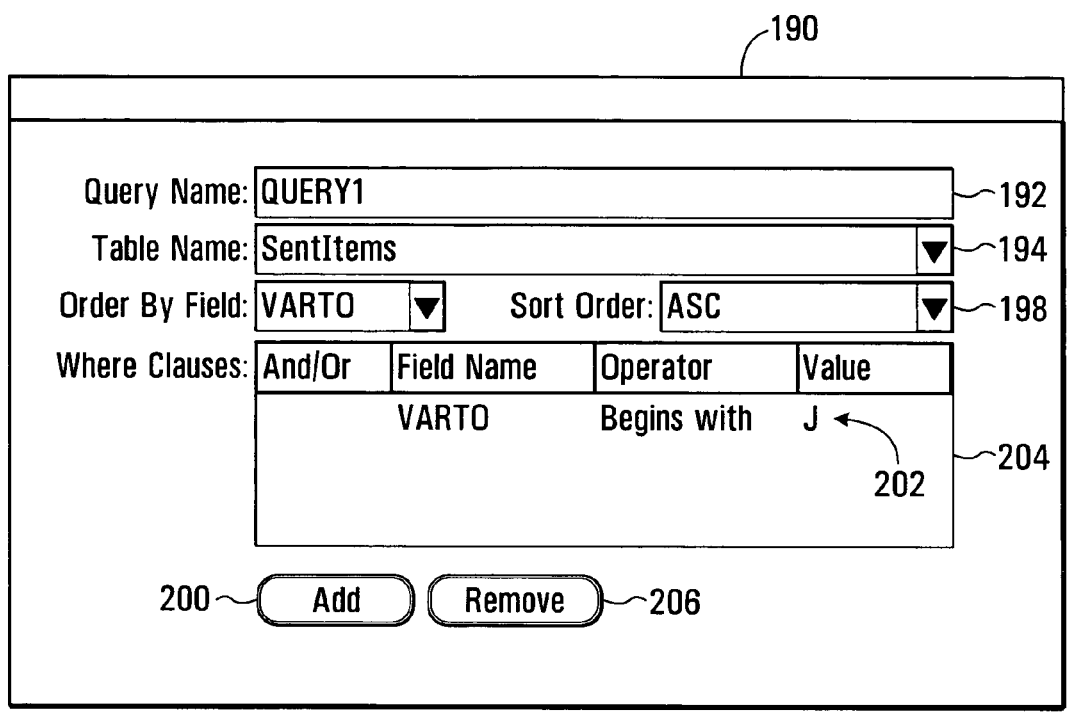

Referring to FIG. 7, the Query Properties window 190 permits the user to enter properties of the newly defined database query. The Query Properties window includes a Query Name field 192 for entering a unique query name that is not already in use by any other query. The name uniqueness constraint ensures that each database query may be uniquely referenced from other areas of the visual hierarchy 170. In the present example, it is assumed that the name "Query1" has been entered. That name is displayed as part of the icon at 188 (FIG. 6). A Table Name field 194 (FIG. 7) allows the developer to select the name of the database table against which the query is to be performed. The field 194 is a drop-down list enumerating the database tables defined under the database tables section 184 of FIG. 6. In the example, a table "SENTITEMS" has been selected from that list. The Order By field 196 specifies that the query results (i.e. the records from table "SENTITEMS" which match the query's search criteria) should be automatically sorted by a field in the "SENTITEMS" table named "VARTO". The drop-down list 196 is automatically populated with the fields defined in the table selected in field 194, i.e. the "SENTITEMS" table. Field 196 can be left blank if the query is designed to return a single record or if the results do not require sorting. When the Order By field 196 has been specified the Sort Order field 198 can be set to either ASC (ascending) or DESC (descending) to control the ordering of query results.

Selection of the Add button 200 of FIG. 7 permits a "where clause" to be defined. As is known in the art, a where clause specifies the search parameters for a database query. An exemplary where clause 202 is illustrated in FIG. 7. The where clause 202 specifies a Field Name, an Operator and a Value. The Field Name indicates which field of the table specified in field 194 is to be examined. The Operator indicates the nature of the operation to be performed (Equals, Not Equal To, Less Than, Greater Than, or in the case of string fields, Begins With) in respect of that field, which is generally a comparison of the field value against another value. The Value is the value against which the named field is to be compared. Thus, the where clause 202 of FIG. 7 causes records to be returned in which the "VARTO" field begins with the letter "J". To define additional where clauses, the Add button 200 may be selected again. A new query, which would appear as another entry row below clause 202 in the Where Clauses field 204 may be similarly defined. For each where clause defined in addition to the first, the AND/OR field is also specified to indicate whether the overall set of where clauses is conjunctive or disjunctive. A where clause may be removed using the Remove button 206. The user can also specify a temporary, named, "scratchpad" value stored at the device to effect a dynamic comparison.

Referring back to FIG. 6, the "Operating Systems" branch 220 comprises the platform-specific components section 174 of visual hierarchy 170. This branch permits the definition of platform-specific aspects of a mobile application, which primarily comprise the displayable GUI screens and control flow of a mobile application. In FIG. 6, only one exemplary GUI screen definition 244 is illustrated. This screen appears within the "Pocket PC" branch 222, indicating the screen is a Pocket PC screen. Other GUI screen definitions are omitted for brevity.

Figure 8:
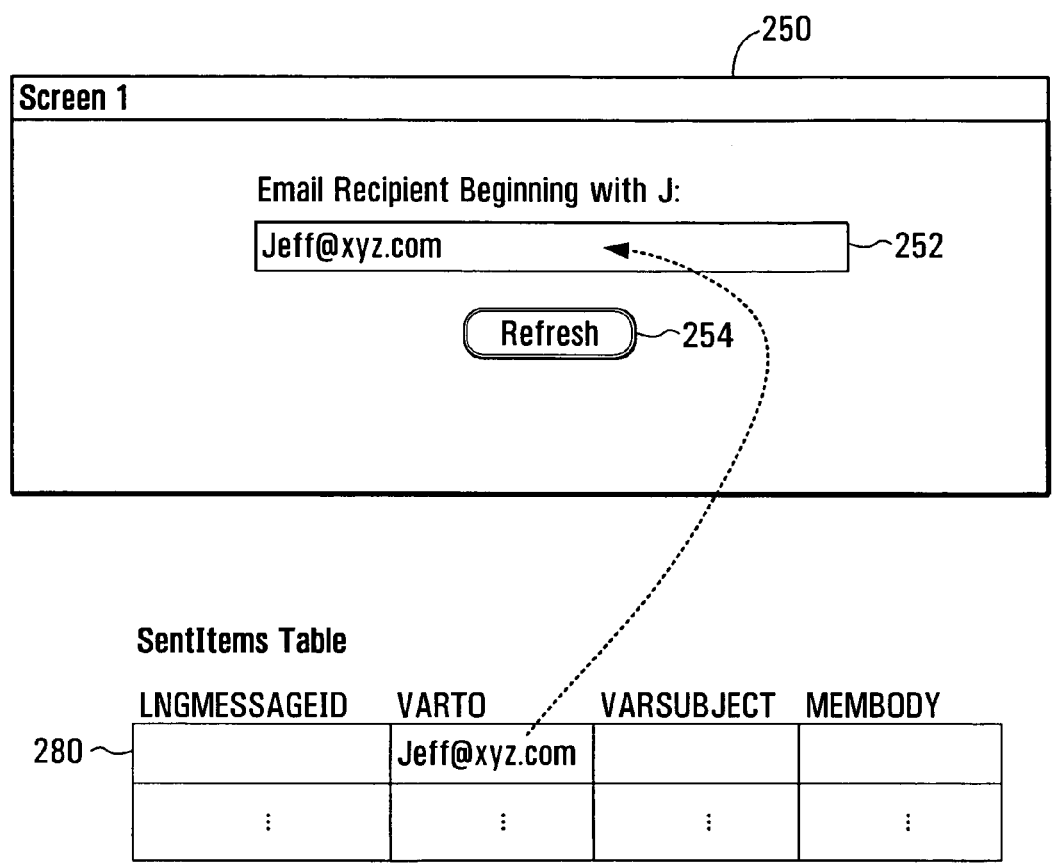
FIG. 8 illustrates a GUI screen presented at the wireless communication device of FIG. 1 at run time along with a database table used to populate the GUI screen.
Figure 9:
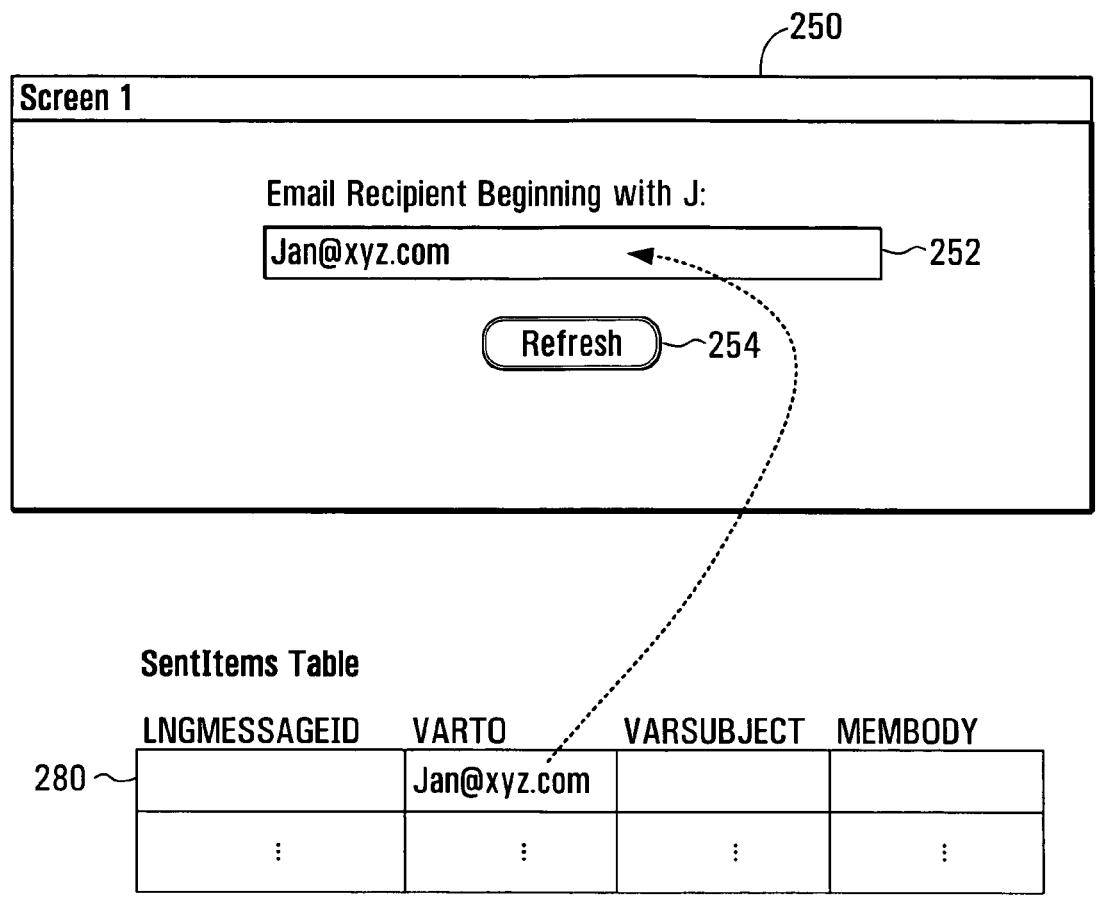
FIG. 9 illustrates the GUI screen and database table of FIG. 8 at a later point in time.

Screen definition 224 defines the GUI screen 250 of FIGS. 8 and 9. Referring to FIG. 8, it can be seen that GUI screen 250 has an edit box 252 and a "REFRESH" button 254. In the present embodiment, it is desired that the edit box 252 (a form of display element) be populated with the value of a field entitled "VARTO" of the database table 280 "SENTITEMS", also shown in FIG. 8, when the screen 250 is displayed. More specifically, the value should be taken from the first row of table 280 (which represents a single email message from the "SENTITEMS" table) in which the value of the "VARTO" field (which represents a destination email address value) begins with the letter "J". Moreover, upon user selection of the "REFRESH" button 254, it is desired for the screen to be redrawn, with the email address in edit box 252 being refreshed. If the value of the "VARTO" field in the first row of the "SENTITEMS" table in which the "VARTO" field value begins with the letter "J" has changed since the last time the query was executed, the changed value should be reflected within edit box 252, as shown in FIG. 9, in which the screen has been redrawn.

Referring back to FIG. 6, below screen definition 224 within the hierarchy 170, two icons 226 and 228 are created. The first icon 226 represents the edit box 252 of FIG. 8. The second icon 228 represents the "REFRESH" button 254 of FIG. 8. Each of these application components may be created by right-clicking the icon 224, choosing the appropriate new display element (from a pop-up menu or a toolbar for example), and defining the new element's properties in properties window 164 (FIG. 5).

A ButtonClick event 230 is defined below the button icon 228. This event represents the selection of the "REFRESH" button 254 of FIG. 8 by a user of wireless communication device 18. Right-clicking of the event icon 230 in project explorer 154 causes another pop-up menu to be displayed. The options that are presented on the displayed pop-up menu include an Add Action option. This option is used to add two actions icons 232 and 234.

The first icon 232 ("Action 1") represents a refresh query action which causes a specified database query, namely database query 188 ("Query 1"), to be to be refreshed at run time. The definition of properties for this action in the properties window 164 is illustrated in inset 236 of FIG. 6. A name field 238 allows the developer to enter a name ("Action 1") that will be displayed in the project explorer 154 as part of the icon 232. A "Type" field 240 provides a drop-down list which lists each type of action that may be performed by a Pocket PC wireless communication device. In FIG. 6, the list is illustrated in a dropped-down state, with one entry, namely "REFRESHQUERY", being selected (as indicated by reverse video), to indicate that the action 232 is a "refresh query" action. Selection of the "REFRESHQUERY" action type results in the further display of a "Query" field 242 in properties window 164. The "Query" field 242 also provides a drop-down list, in this case listing by unique name each global database query which has been defined under the Queries branch 186 of FIG. 6. The drop-down list of FIG. 7 is illustrated in a dropped-down state, with only one entry, namely "Query1", corresponding to the sole query 188 defined present embodiment, being selected.

The second action icon 234 ("Action2") represents a "REFRESH" action that causes the GUI screen 250 of FIG. 8 to be refreshed at run time. The "REFRESH" action is described in Appendix "A" (section 6.3.10).

Figure 10A:

When development of the mobile application using RAD 22 tool is complete, the developer may select a "Save" button, or similar GUI construct, of the application development software 122. When this is done, the application definition DOM tree 138 of FIG. 6 is serialized to form a textual XML markup language document, i.e. master definition file 134, as shown in FIGS. 10A and 10B. This document 134 is stored in the secondary storage 136 of RAD tool 22 (FIG. 4).

The master definition file 134 of FIGS. 10A and 10B contains XML elements representing all of the application constructs defined within the project explorer 154 of FIG. 6. Some XML elements are omitted from FIGS. 10A and 10B for brevity (as indicated by colons). Most of the defined XML entities are detailed in Appendix "A", attached hereto. The defined XML entities are interpreted by the virtual machine software 44, and serve as building blocks for software which presents server-side applications at mobile device 18.

It will be appreciated that lines with the prefix "//", such as lines 1, 16 and 25 of FIG. 10A, are comments that are intended to facilitate comprehension of FIGS. 10A and 10B. They are not valid markup language elements and are not actually present in the generated document 134.

Lines 2-13 of FIG. 10A contain a TDEF markup language element and subordinate FIELDS and FLD elements which cumulatively define the "SENTITEMS" database table 280 of FIG. 8. The FLD elements at lines 4-11 cumulatively specify that a single row in the table (which represents a single sent email message) has four fields, namely, an integer field "LGMESSAGEID" (for storing an email message ID), a string field "VARTO" (for storing a destination email address), a string field "VARSUBJECT" (for storing an email subject line) and a memo field "MEMBODY" (for storing an email message body). The XML element and attribute names at lines 2-13 are as described in the table definitions section 3.2 of Appendix "A".

Lines 18-20 of FIG. 10A contain a QUERY element and subordinate W element which correspond to query 188 of FIG. 6. The values of the NAME, TABLE, ORDERBY and ORDERDIR attributes at line 18 are taken from the Query Name field 192, Table Name field 194, Order By field 196 and Sort Order field 198 of FIG. 7, respectively, as set by the developer. The W element at line 19 represents where clause 202 of FIG. 7.

Lines 27-43 of FIGS. 10A-10B contain a SCREEN element and various subordinate XML elements which cumulatively define the screen 250 of FIG. 8 or 9. Notably, the EB element at lines 30-31 of FIG. 10A includes a DATASRC attribute which specifies that the edit box is to be populated with the value of the VARTO field of the query "QUERY1", declared at lines 18-20, when the edit box is initially displayed. If the query returns multiple records, the value of the VARTO field of the first record is used (other display elements, such as list boxes or grids, may be capable of displaying the value of the VARTO field for each returned record). Also, the ACTION element at line 37 (FIG. 10B) represents a refreshing of the database query defined at lines 18-20 of FIG. 10A and corresponds to the REFRESHQUERY action 232 defined in FIG. 6.

The master definition file 134 of FIGS. 10A-10B is uploaded to transaction server 14 via network 34 (FIG. 1), using conventional mechanisms, and stored in secondary storage of transaction server 14, until it is needed by a wireless communication device 18. At that stage an application definition file 58 is created for the requesting device 18, as described in U.S. patent Publication No. 2003/0060896, and the file 58 is transmitted to the device 18. Advantageously, the application definition file 58 is relatively small in size compared to a typical software application. This may limit the amount of data transmission necessary between the transaction server 14 and device 18.

Upon receipt of the application definition file 58, the XML parser 100 (FIG. 3) at wireless communication device 18 parses the XML text of application definition file 58. XML Parser 100 converts the XML document 58 into a DOM tree representation. The DOM tree is used to facilitate the instantiation of objects 78 (FIG. 3) from classes 64 and the population of their data members with element and attribute values from the document 58 (as described below). For each XML element that is encountered during the traversal, a corresponding object 78 (FIG. 3) may be instantiated from one of object classes 64. Instantiation of each object 78 may be facilitated by a fromXML( ) "constructor" method within the corresponding class 64, which populates the object's data members based on XML element/attribute values. For example, the constructor method may receive the XML fragment which defines the XML element in the application definition file 58 and, based on element and attribute values within the fragment, automatically populate the newly-instantiated object's data members with like values. It is noted that the constructor method may or may not meet the strict definition the term "constructor" as it is understood in the context of certain object-oriented programming languages (e.g. the method may not have the same name as the class). Once the objects 78 have been instantiated and so populated, the DOM tree may be deallocated.

Figure 11:
FIG. 11 is a pseudocode representation of an object-oriented Query class which may be instantiated at one of the wireless communication devices of FIG. 1.

With reference to FIG. 10A, parsing of the QUERY element at lines 18-20 accordingly results in the instantiation of the query object 82 (FIG. 3) from Query class 66 which is illustrated in pseudocode form in FIG. 11, and in the invocation of its fromXML( ) method, shown at FIG. 11, lines 15-18. In FIG. 11, text following a "//" delimiter denotes a comment (this is also true in FIGS. 12-14 and 15A-15B). The fromXML( ) method causes local data members "name" and "table" (lines 6-7 of FIG. 11) to be set to the attribute values of the same name from the QUERY element XML that is passed as an input parameter. The "whereparams" data member (line 8) is populated by parsing the subordinate W element(s) and populating a WhereParam object for each W element. The WhereParams class is illustrates in FIG. 17. Thereafter, the runQuery( ) method (lines 20-24 of FIG. 11) is invoked to cause the query to be executed. The query is executed at this stage so that a snapshot of desired table data will be available during instantiation of GUI screen objects, whose textual aspects may be initialized based on the retrieved table data. The runQuery( ) method in turn invokes the general purpose routine executeQuery 108. Matching records are returned in the "records" parameter.

The executeQuery method 108 is illustrated at lines 7-13 of FIG. 16, which illustrates various general purpose routines 80 (FIG. 3). The executeQuery method accepts a query object as a parameter. Instructions within the method cause the query to be performed. The supplied query string is passed to the DBMS 48 (FIG. 2) at the mobile device 18. The instructions may interact with an Application Programming Interface (API) of DBMS 48 (e.g. may invoke API functions, routines, procedures or methods). The instructions may be DBMS-specific and will be known to those skilled in the art. An exemplary set of instructions is described at www.w3schools.com/ado/ado_reference_connection.asp, which is hereby incorporated by reference hereinto. The records array data member of the query object is populated with database records matching the search parameters. It will be appreciated that the body of method 108 could alternatively be included within the runQuery method of the query object 82.

XML elements that are nested within application definition file 58 may result in the instantiation of corresponding objects 78 in a "cascade" fashion. For example, parsing of the SCREEN element at lines 27-43 of FIGS. 10A-10B results in the instantiation of the screen object 82 (FIG. 3) from Screen class 68, illustrated in pseudocode form in FIGS. 12A and 12B, and in the invocation of its fromXML( ) method, shown at FIG. 12, lines 16-26. The fromXML( ) method initially causes local data members "name" and "title" (lines 6-7 of FIG. 12A) to be set to the attribute values of the same name from the SCREEN element XML that is passed as an input parameter.

Thereafter, for each EB (edit box) element subordinate to the SCREEN element, the fromXML( ) method: (1) instantiates a new Editbox object from Editbox class 70 and adds it to its editboxes array (declared at lines 10 of FIG. 12A), and (2) passes the XML for the EB element to the fromXML( ) method of the newly declared Edit Box object.

In the illustrated example, only one EB element is declared in the application definition file 58 (corresponding to lines 30-31 of the master definition file 134 of FIG. 10A), therefore only one editbox object 88 is instantiated from class 70 (FIG. 3). The Editbox class 70 is illustrated in pseudocode form in FIG. 13. The fromXML( ) method (lines 17-29 of FIG. 13), which is invoked immediately following instantiation of the editbox object 88, causes local data members (in this case "name", "text", "index", "caption" and "datasource"—see lines 6-10 of FIG. 13) to be set to the attribute values of the same names from the XML that is passed as an input parameter. When the datasource attribute is specified to a non-null value, as it is in the exemplary application definition (see line 31 of FIG. 10A), the value of the "text" element, which is the text that the wireless communication device user sees within the edit box upon initial display of the screen 250, is overwritten with the value of the specified field of the specified query. A general purpose routine getQueryField 112 is invoked (see lines 20-23 of FIG. 13) to obtain the desired text. The queryname and fieldname parameters are obtained by parsing them from the datasource data member.

The getQueryField routine, which is illustrated in pseudocode form at lines 15-20 of FIG. 16, searches for a global query object within objects 78 (FIG. 3) whose name matches the specified "queryname" input parameter and then invokes the getField method of that object. The latter method, which is illustrated at lines 27-30 of FIG. 11, returns the value of field fieldname of the query's currently indexed record. The index, current (FIG. 11, line 12), is initialized to index the first returned record when query results are returned. In this example, the value of the "VARTO" field of the "QUERY1" query is returned, which, based on the QUERY XML element at lines 18-20 of FIG. 10A, will be a string beginning with "J".

When the instantiation of the edit box object 88 (FIG. 3) is complete, a similar approach is taken to instantiate other display elements comprising the GUI screen 250 (FIG. 8). Referring back to the fromXML( ) method at lines 24-25, FIG. 12A, for each additional subordinate display element of the encompassing GUI screen: (1) the relevant subordinate object 78 is instantiated from the appropriate one of object classes 64 (FIG. 3) and added to an appropriate array within the data members of the screen object (FIG. 12A, line 13); and (2) the XML for the subordinate element is passed to the fromXML( ) method of the newly declared subordinate object so that the object may populate its data members and instantiate any further subordinate objects appropriately.

As GUI screen 250 is relatively simple, the only other display element for which the above steps are taken is the button 254 (FIG. 8). Button object 90 (FIG. 3) is instantiated from Button class 72, which is illustrated in pseudocode form in FIG. 14, and its fromXML( ) method (lines 14-22 of FIG.

14) is invoked. This method causes local data members (in this case, "name", "index" and "caption") to be set to the attribute values of the same names from the XML that is passed as an input parameter (i.e. lines 34-41 of FIG. 10B).

Pseudocode at lines 17-21 of FIG. 14 causes the subordinate event object 92 (FIG. 3), which is declared at lines 36-39 of FIG. 10B (details omitted for brevity) and is representative of a run-time selection of the button 254 of FIG. 8, to be instantiated. In turn, the event object instantiates two subordinate action objects 94 and 96 (FIG. 3) from Action class 76, which is illustrated in pseudocode form in FIG. 15A-15B, based on the ACTION elements at lines 36 and 37 of FIG. 10B, and invokes the fromXML( ) method of each object. The latter method simply sets the type data member to the value of the type attribute. In the case of object 94, the type is set to "REFRESHQUERY" and the queryname data member is set to "QUERY1". In the case of object 96, the type is set to "REFRESH" (i.e. screen refresh) and the name data member is set to "SCREEN1" (indicating screen 250).

Once the above-described cascade of invocations of fromXML( ) methods through the various instances of object classes 64 has successfully completed, the result is a hierarchical set of objects 82, 88, 90, 92, 94 and 96 as shown in FIG. 3. For certainty, illustration of an object within the border of another object in FIG. 3 connotes the latter object's containment of the former. Assuming that the first record in the "SENTITEMS" table 280 in which the VARTO field begins with "J" contains the value "Jeff@XYZ.com", the appearance of the screen 250 when it is first displayed will be as shown in FIG. 8.

Subsequent to the initial display of the screen 250 at wireless communication device 18, operation of system 10 (FIG. 1) causes the SENTITEMS table 280 to be updated in memory at the device 18 such that the first record in the "SENTITEMS" table 280 in which the VARTO field begins with "J" now contains the value "Jan@XYZ.com", as shown in FIG. 9, even while screen 250 continues to display "Jeff@XYZ.com". To refresh the screen, the REFRESH button 254 may be selected by the wireless communication device user. Selection of the button 254 triggers, by way of operating system callback, the invocation of a method, which may be named "onEvent( )" for example (not expressly illustrated), of the button object 90. The role of the onEvent( ) method is to execute a method, which may be named doAction( ) for example, for each of its subordinate action objects in sequence to effect the actions associated with the event.

In the present example, the doAction( ) method of the first subordinate action object 94 is invoked first. This method is illustrated in pseudocode form at lines 27-42 of FIGS. 15A-15B. The purpose of the method is to perform the action represented by the action object. The body of the method contains a large switch statement which causes different instructions to be executed based on the action type data member (declared at FIG. 15A, line 7). In the case of object 94, the type is "REFRESHQUERY", thus the doAction( ) method invokes the RefreshQuery (queryname) general purpose routine 110 (FIG. 15A, line 35).

The RefreshQuery(queryname) general purpose routine is illustrated in pseudocode form at FIG. 16, lines 1-5. This routine searches within objects 78 for a Query object whose name matches the value of the queryname parameter, then invokes the runQuery( ) method of that object to cause the query to be (re-)executed. In the present embodiment, it is assumed that execution of the runQuery( ) method of the matching query object 82 retrieves one or more records from the "SENTITEMS" table 280 (FIG. 9), with the VARTO field value of the first record now being "Jan@XYZ.com". Notably, the developer may elect to refresh the query via a "REFRESHQUERY" action without redisplaying the screen via a "REFRESH" action, e.g. to ensure the currency of data for use in composing an XML package, by only specifying a "REFRESHQUERY" action. In other words, depending upon the XML elements specified by the developer, the runQuery( ) method may instantiated and executed mutually exclusively to any instantiation and execution of code which causes the user interface screen 250 to be refreshed.

In the present embodiment, the doAction( ) method of the second subordinate action object 96 is subsequently executed, however, as refreshing of the user interface screen 250 is in fact desired. This invocation in turn causes the RefreshScreen(name) general purpose routine screen 106, as shown in pseudocode at FIG. 16, lines 22-26, to be invoked (see invocation at FIG. 15A, line 32). This routine 106 searches within objects 78 for a screen object whose name matches the value of the screenname parameter, then invokes refreshScreen( ) method of that object to cause the screen to be refreshed (see FIG. 12A-12B, lines 28-40). In the result, the screen 250 will appear as shown in FIG. 9.

If, in another part of the mobile application, it were desired to display in a user interface screen 250 the results obtained upon the initial performance of the database query 188 without first causing the query to be refreshed (e.g. in order to conserve processing resources in the case where the database 60 is known not to have changed), then this could be done by simply referencing the query "QUERY1" without executing a "REFRESHQUERY" action first. In other words, depending upon the XML elements specified by the developer, the refreshScreen( ) method may instantiated and executed mutually exclusively to any instantiation and execution of code which causes the database query to be refreshed.

In another example, if an application had drop-down lists of static data populated from a database, then these lists would not have to be refreshed each time when the user refreshes the screen. On a wireless communication device, accessing persistent data can be time-consuming. By populating static drop-down lists from an application-level query, the screens need not refresh the contents of these dropdown lists upon screen display. As can be seen from the RefreshScreen( ) method of FIGS. 12A-12B, only screen queries need be refreshed on a refreshscreen call. Global queries need not be refreshed. As well, if the data source of a GUI control is a global query and it is determined that the query has not been refreshed since the last time the control was populated, logic may be executed that refrains from any re-population of the control due to the absence of any recent query refreshes. This can result in a significant processing savings when displaying screens.

As will be appreciated by those skilled in the art, modifications to the above-described embodiment can be made without departing from the essence of the invention. For example, markup language documents need not be written using XML. Alternative markup languages (e.g. Standard Generalized Markup Language, of which XML is a subset) could be employed. Moreover, the choice of markup language element and attribute names may differ from those described above.

In the above-described embodiment, the exemplary query is a platform-independent query which is referenced from a platform-specific display element, namely, an edit box within a Pocket PC GUI screen which uses the referenced query's results for the purpose of setting its initial textual content. Although not expressly disclosed above, an edit box may be defined using the RAD tool 22 in an analogous GUI screen for another type of wireless communication device (e.g. a RIM wireless communication device). Such an edit box may similarly reference the platform-independent query, so that the query results may similarly be used to set the initial textual content of the edit box for that platform. Thus, references to a single platform-independent query may exist in a number of different platform-specific display elements. This may conveniently relieve a user of RAD tool 22 from having to define the query once for each platform. When a platform-specific application definition file 58 is generated from the master definition file 134 at transaction server 14, however, only the GUI screen definitions for the platform of interest are included in the file 58. Accordingly, any analogous display elements for other platforms referencing the same global query will not appear within the application definition file 58 that is downloaded to the wireless communication device. As a result, the number of instantiated objects referencing a common global query object may typically not exceed one at any given device in the context of the above-described embodiment.

Nevertheless, it will be appreciated that a query may be referenced by more than one display element (or other construct) of a mobile application in alternative embodiments. For example, it is possible that two or more GUI screens in a mobile application for a given platform may have an edit box that references the same query. In this case, the referencing of a commonly defined query object may result in improved efficiency in comparison with an alternative approach in which queries must be defined on a per-screen basis and in which multiple similar or identical query objects are therefore instantiated at run time.

Some embodiments may only support singular (versus compound) where clauses. In such embodiments, QUERY markup language elements may not have subordinate W (where clause) elements. Rather, where clause attributes may be incorporated directly into the QUERY markup language element.

In alternative embodiments, the DBMS may not support structured query language. Another form of query language may be supported instead.

Other modifications will be apparent to those skilled in the art and, therefore, the invention is defined in the claims.

What is claimed is:

1. A machine-readable medium comprising:
    code for defining a database query based on at least one markup language element representing said database query, said code including instructions for causing said database query to be performed and instructions for storing a result of said database query;
    code for displaying a user interface screen having a display element that is based at least in part upon said result of said database query, said user interface screen being based on at least one markup language element representing said user interface screen;
    code for refreshing said user interface screen based on a markup language element representing said refreshing of said user interface screen that is distinct from and references said markup language element representing said user interface screen; and
    code for refreshing said database query based on a markup language element representing said refreshing of said database query that is distinct from and references said markup language element representing said database query,
    wherein said code for refreshing said user interface screen and said code for refreshing said database query are each independently executable based upon a user specification of a respective one of said markup language element representing said refreshing of said user interface screen and said markup language element representing said refreshing of said database query.

2. The machine-readable medium of claim 1 wherein said code for refreshing said user interface screen and said code for refreshing said database query are object-oriented and wherein said independently executable code comprises independently instantiatable code.

3. The machine-readable medium of claim 2 wherein both of said object-oriented code for refreshing said database query and said object-oriented code for refreshing said user interface screen are defined within a single object-oriented class.

4. The machine-readable medium of claim 3 wherein said instantiation of said object-oriented code for refreshing said user interface screen comprises instantiating a first instance of said object-oriented class and setting data members of said first instance based on attributes of the markup language element representing said refreshing of said user interface screen, and wherein said instantiation of said object-oriented code for refreshing said database query comprises instantiating a second instance of said object-oriented class and setting said data members of said second instance based on attributes of the markup language element representing said refreshing of said database query.

5. The machine-readable medium of claim 2 wherein said object-oriented code for refreshing said database query is defined within a first object-oriented class and said object-oriented code for refreshing said user interface screen is defined within a second object-oriented class.

6. The machine-readable medium of claim 5 wherein said instantiation of said object-oriented code for refreshing said user interface screen comprises instantiating an instance of said first object-oriented class and setting data members of said instance based on attributes of the markup language element representing said refreshing of said user interface screen, and wherein said instantiation of said object-oriented code for refreshing said database query comprises instantiating an instance of said second object-oriented class and setting data members of said instance of said second object-oriented class based on attributes of the markup language element representing said refreshing of said database query.

7. The machine-readable medium of claim 1 wherein said markup language element representing said refreshing of said user interface screen and said markup language element representing said refreshing of said database query are both instances of the same markup language element, each instance having at least one attribute whose value differs from a value of a corresponding attribute of the other instance.

8. A wireless communication device comprising:
    a processor; and
    a memory coupled to said at least one processor, storing:
        code for defining a database query based on at least one markup language element representing said database query, said code including instructions for causing said database query to be performed and instructions for storing a result of said database query;
        code for displaying a user interface screen having a display element that is based at least in part upon said result of said database query, said user interface screen being based on at least one markup language element representing said user interface screen;
        code for refreshing said user interface screen based on a markup language element representing said refreshing of said user interface screen that is distinct from and references said markup language element representing said UI screen; and code for refreshing said database query based on a markup language element representing said refreshing of said database query that is distinct from and references said markup language element representing said UI screen, wherein said code for refreshing said user interface screen and said code for refreshing said database query are each independently executable based upon a user specification of a respective one of said markup language element representing said refreshing of said user interface screen and said markup language element representing said refreshing of said database query.

9. The device of claim 8 wherein said code for refreshing said user interface screen and said code for refreshing said database query are object-oriented and wherein said independently executable code comprises independently instantiatable code.

10. The device of claim 9 wherein both of said object-oriented code for refreshing said database query and said object-oriented code for refreshing said user interface screen are defined within a single object-oriented class.

11. The device of claim 10 wherein said instantiation of said object-oriented code for refreshing said user interface screen comprises instantiating a first instance of said object-oriented class and setting data members of said first instance based on attributes of the markup language element representing said refreshing of said user interface screen, and wherein said instantiation of said object-oriented code for refreshing said database query comprises instantiating a second instance of said object-oriented class and setting said data members of said second instance based on attributes of the markup language element representing said refreshing of said database query.

12. The device of claim 9 wherein said object-oriented code for refreshing said database query is defined within a first object-oriented class and said object-oriented code for refreshing said user interface screen is defined within a second object-oriented class.

13. The device of claim 12 wherein said instantiation of said object-oriented code for refreshing said user interface screen comprises instantiating an instance of said first object-oriented class and setting data members of said instance based on attributes of the markup language element representing said refreshing of said user interface screen, and wherein said instantiation of said object-oriented code for refreshing said database query comprises instantiating an instance of said second object-oriented class and setting data members of said instance of said second object-oriented class based on attributes of the markup language element representing said refreshing of said database query.

14. The device of claim 8 wherein said markup language element representing said refreshing of said user interface screen and said markup language element representing said refreshing of said database query are both instances of the same markup language element, each instance having at least one attribute whose value differs from a value of a corresponding attribute of the other instance.

15. A method of effecting independently refreshable, markup language-based database queries and user interface screens, comprising:
at a wireless communication device having a processor and a memory coupled to said at least one processor, the memory storing code that, upon execution by said processor, causes said device to:
define a database query based on at least one markup language element representing said database query, cause said database query to be performed and store a result of said database query;
display a user interface screen having a display element that is based at least in part upon said result of said database query, said user interface screen being based on at least one markup language element representing said user interface screen;
refresh said user interface screen based on a markup language element representing said refreshing of said user interface screen that is distinct from and references said markup language element representing said user interface screen; and
refresh said database query based on a markup language element representing said refreshing of said database query that is distinct from and references said markup language element representing said database query,
executing each of said refreshing of said user interface screen and said refreshing of said database query independently of the other based upon a user specification of said markup language element representing said refreshing of said user interface screen and said markup language element representing said refreshing of said database query respectively.

* * * * *